United States Patent

Wagner

Patent Number: 5,364,696
Date of Patent: Nov. 15, 1994

[54] POLYSTYRENE FOAM SHEET USEFUL FOR FORMING DEEP DRAWN ARTICLES, A PROCESS TO PRODUCE THOSE ARTICLES, AND THE DEEP DRAWN ARTICLES

[75] Inventor: Phillip A. Wagner, Essexville, Mich.

[73] Assignee: The Dow Chemical Company, Midland, Mich.

[21] Appl. No.: 210,821

[22] Filed: Mar. 18, 1994

Related U.S. Application Data

[62] Division of Ser. No. 81,043, Jun. 22, 1993.

[51] Int. Cl.$^5$ .............................................. B32B 3/26
[52] U.S. Cl. .................. 428/318.6; 264/321; 264/553; 428/317.9; 428/319.7; 428/319.9; 521/139; 521/146
[58] Field of Search .............. 428/319.9, 318.6, 317.9, 428/319.7; 521/139, 146; 264/321, 553

[56] References Cited

U.S. PATENT DOCUMENTS

| | | |
|---|---|---|
| 3,260,781 | 7/1966 | Lux et al. |
| 3,338,997 | 9/1967 | Tigner |
| 3,531,555 | 9/1970 | Tiffin et al. |
| 4,096,224 | 6/1978 | Simon et al. |
| 4,214,056 | 7/1980 | Lavengood |
| 4,239,727 | 12/1980 | Myers et al. |
| 4,359,160 | 11/1982 | Myers et al. |
| 4,493,922 | 1/1985 | Echte et al. |
| 4,528,221 | 7/1985 | Komatsuzaki et al. |
| 5,039,714 | 8/1991 | Kasahara et al. |

Primary Examiner—Morton Foelak

[57] ABSTRACT

A polystyrene foam sheet comprising a polystyrene resin which contains 1 to 15 wt. % of a rubber component having a majority of particle sizes less than about 0.45 microns has been found to be superior for forming deep drawn articles. Optionally one or two films may be extrusion coated or laminated to the foam sheet prior to thermoforming. Also disclosed is a method for thermoforming the foam sheet. Preheat the sheet, clamp the sheet between the matched male and female mold members, move the members into final position while applying a vacuum through both members to both sides of the foamed sheet and then chill formed foam to set a final shape.

14 Claims, 3 Drawing Sheets

POLYSTYRENE FOAM SHEET USEFUL FOR FORMING DEEP DRAWN ARTICLES, A PROCESS TO PRODUCE THOSE ARTICLES, AND THE DEEP DRAWN ARTICLES

CROSS-REFERENCE TO RELATED APPLICATION

This is a divisional of application Ser. No. 08/081,043 filed Jun. 23, 1993 pending.

BACKGROUND OF THE INVENTION

Packaging is a major area for use and consumption of foamed polystyrene resins. This packaging is often fabricated from foamed polystyrene sheet into deep drawn cups, tubs, bowls, trays and similar articles by thermoforming the foamed sheet. It is desirable to have a foam sheet suitable for thermoforming cups and other deeply drawn articles in a single thermoforming operation.

Accordingly, it is an object of this invention to provide a polystyrene foamed sheet which can be formed efficiently into deeply drawn articles in addition to providing the thermoformed deeply drawn articles made from the polystyrene foamed sheet and optionally at least one integral, high-density skin.

This invention also provides as an object a method of producing three-dimensionally thermoformed deep drawn articles of a low-density polystyrene foam core and optionally at least one integral, high-density skin.

BRIEF DESCRIPTION OF PRIOR ART PRACTICES

In the past, matched mold thermoforming has been commonly employed to form articles from preformed thermoplastic sheet material, which sheet is initially formed utilizing well known thermoplastic extrusion techniques. The sheet is subsequently preheated and placed between male and female mold halves, which, as they close, press and form the sheet into the desired product shape. Obviously, in such an operation, the material distribution of the formed product will depend upon the shapes of the mold halves.

An alternate forming arrangement which may be employed to thermoform plastic sheet includes vacuum thermoforming. A vacuum is applied beneath the preheated sheet to be formed causing atmospheric pressure to push the sheet down into contact with the mold. As the sheet contacts the mold it cools and sets in the desired configuration. Usually those areas of the sheet material which reach the vacuum mold member last are the thinnest having been drawn to a greater extent than the remainder of the material being formed.

Other prior art thermoforming techniques include a two-stage thermoforming technique whereby, utilizing a plug member, a preheated plastic sheet is only partially preformed into a desired configuration and, after the preforming step, the thermoforming step is completed whereby the matched mold members come together to form the desired finished article. U.S. Pat. No. 3,825,166 discloses such a forming method.

In another example, U.S. Pat. No. 3,141,595 discloses a plastic cup made from a laminate of foamed material, such as low density polystyrene having a density of approximately 6–10 lbs. per cubic foot, and a high density material such as a high impact polystyrene sheet having a density of approximately 63 lbs. per cubic foot. This cup is provided with a series of projections which represent thickened sidewall regions having a lower density than portions of the sidewall remote from the projections. U.S. Pat. No. 3,141,595 achieves the thickening and lowering of the density in the sidewall regions as a result of the migration of entrapped gases through ruptured cells in the foamed material at the interface between the foamed, low density material and the unfoamed high density material. This disclosure does not relate to providing a continuous uninterrupted outer surface on a sidewall which is thickened, nor to providing thickened sidewall regions in a single ply cup.

In U.S. Pat. No. 4,528,221 there is disclosed a polystyrene foamed sheet suitable for thermoforming into containers, such as cups and trays. The foamed sheet must have a polystyrene resin as the base resin, 1–30% (percent) of a rubber component and 1–20% of a filler component. In addition the foamed sheet must have a bulk density of 0.13–0.7 g/cm$^3$ (grams/centimeter cubed) (8.12–43.7 pounds per cubic feet), a stretch ratio less than 1.25 and an amount of residual blowing agent less than 0.3 mole/kg (moles of blowing agent/kilogram).

One limitation in the prior art practices is the inability to be able to easily form a deep drawn articles using these techniques.

The conventional approach for making formed articles from foamed or cellular thermoplastics is a two-stage process. In the first stage, foamed sheeting is extruded and collected on rolls. The rolls are stored until the second stage, which employs a conventional thermoforming machine for reheating the material on a progressive basis and forming it in molds through the use of differential air pressure, plungers, or both, whereupon the formed web is transported to a cutting machine for severing the formed articles from the selvage. The extrusion operation for producing the sheet material is thus an entirely separate operation (in relation to time and the utilization of heat energy) from the fabricating operation for forming and cutting the articles.

The conventional two-stage process has many limitations affecting cost, quality control, and operational control. Because of the separation of the extrusion and fabricating operations, quality control becomes more difficult and costly. Defects in the sheeting which are not apparent until molding begins can not then be corrected, resulting in the rejecting of large quantities of material. Since foam sheeting has excellent thermal insulating properties, it is difficult and costly to heat it properly during the fabrication step. With certain types of thermoplastic foam sheeting, there is a period of aging during which volatiles used in the foaming process are evolved and replaced by air. Therefore, careful attention must be paid to the time when the reheating in the fabrication step takes place, because the residual content of the volatiles can have an appreciable effect on the final density of the product. This necessitates operational controls which further complicate the manufacturing process. Due to the difficulties in obtaining uniform heat and because of the necessity of waiting until a large percentage of the volatiles have evolved from the material, it is not possible to form the foam sheeting as readily or as deeply as would otherwise be the case.

Moreover, problems which plague the two-stage process become more difficult when attempting to thermoform deep drawn articles from foamed thermoplastic having a low-density core covered with an integral skin. It is extremely difficult to reheat the core to the necessary forming temperature without adversely affecting the skin. The presence of the skin tends to produce uneven reheating of the sheeting, resulting in imperfections in the formed articles. Molecular orientation of the skin, which may be important to the overall strength of the formed product, is reduced or destroyed by reheating. Also, in some instances, deep drawn articles must be pieced together due to the difficulty of forming a unitary article from a single piece of foam sheet.

Processes developed heretofore have not met the requirements for successful application to deeply drawn low-density foamed thermoplastic articles.

SUMMARY OF THE INVENTION

A polystyrene foam sheet is a polystyrene resin having 1 to 15 weight % of a rubber component (based on polystyrene resin weight) having a majority of particle sizes less than about 0.45 microns with the foam sheet with the foam sheet having a density of 0.04 to 0.16 g/cm$^3$ (2½–10 lb/ft$^3$) and a thickness of 0.4 to 6.5 mm has been found to be superior for forming deep drawn thermoformed articles.

A method for thermoforming these deep drawn thermoplastic foam articles has the steps of preheating the sheet of thermoplastic foam stock material which contains 1 to 15 wt. % of a rubber component (based on polystyrene resin weight) having a majority of particle sizes less than about 0.45 microns with the foamed sheet having a density of 0.04 to 0.16 g/cm$^3$ (2½–10 lb/ft$^3$) and a thickness of 0.4 to 6.5 mm, then clamping said preheated stock material in a fixed position between matched male and female mold members relatively moving said male and female mold members into final forming position to stretch said sheet into the female cavity, applying a vacuum through both the male and female mold members to both sides of the foamed sheet, while moving the mold members into the final forming position, to help expand the sheet into conformity with substantially the entire cooperating surfaces of both the mold members and then chilling the stock material to set a final shape.

Also disclosed are the deep drawn articles made from the polystyrene foam sheet and the method of the present invention.

DETAILED DESCRIPTION

The foamed polystyrene sheet of the present invention is a 0.4 to 6.5 mm (millimeter) thick foam sheet composed chiefly of polystyrene resin.

Preferably, the foamed sheet also has one or two non-foamed resin films which may be extrusion coated or laminated by fusion bonding onto one or both major surfaces of the foam in those manners generally known in the art. The non-foamed resin film is a 5 to 600 μm (micrometers) thick thermoplastic resin film.

The foamed sheet contains 1 to 15 wt. % (based on polystyrene weight) of a rubber component. Preferably the foamed sheet contains 1 to 10 wt. % of a rubber component, most preferably the foamed sheet contains 1 to 5 wt. % of a rubber component. The physical characteristics of the rubber component are critical for the production of the deeply drawn articles of the present invention.

Commercial high-impact polystyrene (HIPS) and some impact modified acrylonitrile-styrene-butadiene (ABS) resins have grafted rubbery particles of broad size distribution in the range of 1 to 5 micron (1000–5000 nanometers, nm) average particle diameter. Some workers consider such relatively large particle sizes to be necessary to afford the best impact properties in aromatic polymer blends, however, particle sizes greater than about 400 nm (nanometers) are highly detrimental to clarity of the blends, due to the sensitivity of visible light scattering to particle size in this particle size range.

Clarity is not a requirement for a polystyrene foam sheet products and thus previously particle size and particle size distribution of the rubber particles was not considered to be an important variable in the making of foam sheet.

In order to be able to successfully and continuously produce a deeply drawn thermoformed article, the foam sheet must contain a minimum of at least one percent (1%), and preferably at least two percent (2%),of a rubber component in a polystyrene matrix with the rubber component having specific characteristics. One type of such material is generally known as impact polystyrene. The impact polystyrene must have a majority, and preferably greater than seventy percent (70%) percent, of the occluded or dispersed rubbery particles with an average particle diameter less than about 0.45 microns and should generally have a conventional core-shell morphology (i.e., a rubber shell or membrane around a core of polystyrene). If larger particles are also used they must not exceed an average particle diameter of about 2.5 microns. More preferably the ratio of small to large particles is at least 80/20 (small/large) and most preferably it is 85/15.

Figure 1:
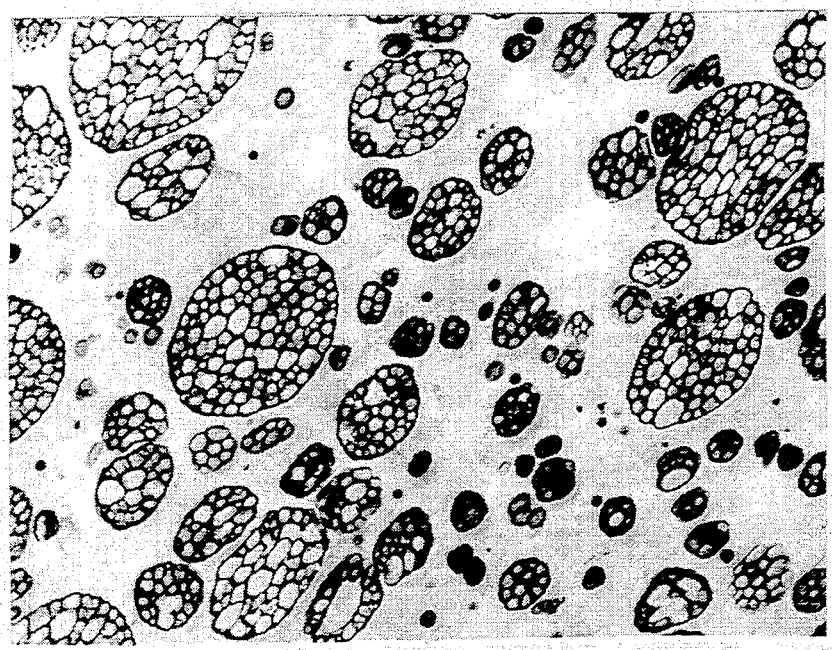
FIG. 1 is a 9,000× photomicrograph of an impact polystyrene having a rubber particle size of 2.8 microns.

FIG. 1 is a photomicrograph of an impact polystyrene having a rubber particle size of 2.8 microns. Foam which are made from this impact polystyrene or blends of this impact polystyrene with a polystyrene homopolymer do not consistently produce deeply drawn thermoformed articles.

Figure 2:
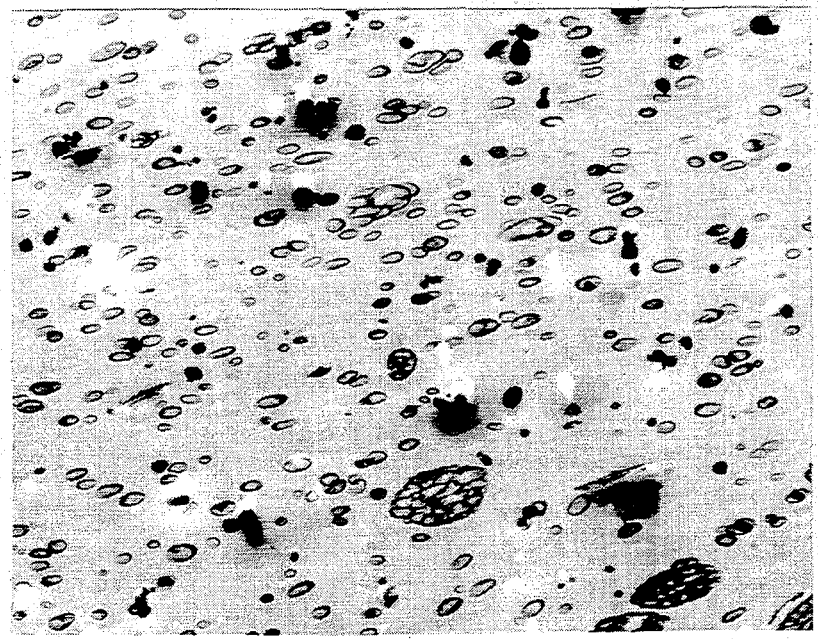
FIG. 2 is a 9,000× photomicrograph of rubber particles in foam sheet cell walls where there are two rubber particle sizes, 0.2 and 1.8 microns with eighty-seven percent (87%) being the 0.2 size.

FIG. 2 is a photomicrograph of rubber particles in foam sheet cell walls where there are two rubber particle sizes, 0.2 and 1.8 microns with eighty-seven percent (87%) being the 0.2 size. This foam consistently produces deeply drawn thermoformed articles.

The impact polystyrene should have a weight percent rubber of between 1–15 weight percent, preferably 1–10 weight percent, rubber based on the rubber component, such as polybutadiene. Preferably the weight percent rubber is between seven and ten. The weight average molecular weight $M_w$ should be between 100,000 and 300,000. and preferably between 150,000 and 200,000. The molecular distribution, $M_w/M_n$, should be between 2.7 to 2.9.

One preferred foam sheet is a blend of thirty percent of an impact polystyrene and seventy percent of a general purpose polystyrene homopolymer with a weight average molecular weight of about 325,000 and a melt flow rate of about 1.5 grams/10 minutes, such as for example, STYRON 685D, available from The Dow Chemical Company. More preferably the foam sheet has twenty percent of the impact polystyrene with the remainder being a general purpose polystyrene.

The foam sheet should have a bulk density of 0.04 to 0.16 g/cm$^3$ (grams per centimeter cubed) (about 2½ to about 10 pounds per feet cubed). Preferably the foam sheet has a bulk density of 0.04 to 0.128 g/cm$^3$ (about 2½ to about 8 pounds per feet cubed).

The foamed sheet of this invention exhibits very good thermoformability when used for deep drawing. It is particularly suitable for producing deeply drawn cup-like formed parts having a desired strength and a draw ratio (b/a, where b is depth and a is the widest diameter) greater than 1.0 (i.e. the ratio of the depth to the widest diameter is at least 1:1).

The article which is specifically disclosed in this application is a deep drawn cup commonly utilized to contain hot fluids and to prevent irritation to the holder thereof. Such cups can be made in standard sizes, such as 6 ounces, 8 ounces and even larger sizes. The foamed, cellular thermoplastic cup can be provided with a high gloss non-porous densified skin layer on the inner surface, and optionally an outer densified, high gloss surface, and a low density cellular core. The lip may be rolled inwardly by suitable lip rolling equipment, such as helical screw lip rollers presently in common usage.

The polystyrene resin constituting the polystyrene foamed sheet of this invention includes polymers made up of styrene-type vinyl monomers such as styrene, methylstyrene, and dimethylstyrene, and also includes copolymers made up of styrene-type vinyl monomers and other vinyl monomers such as acrylic acid, methacrylic acid or ester thereof, acrylonitrile, acrylamide, methacrylonitrile, and maleic anhydride.

The polystyrene foamed sheet of invention can be prepared by extrusion-foaming the resin composition made up of a polystyrene resin and the specific required quantities of rubber component and, if required, a filler. The above-mentioned rubber component may be added directly, but is usually contained in a high-impact polystyrene which is then blended with a polystyrene homopolymer. The rubber component in the high-impact polystyrene may be present in any amount generally known in the art, so long as when it is blended with the polystyrene homopolymer the final rubber component content in the foamed product does not exceed fifteen percent (15%), preferably ten percent (10%) and most preferably five percent (5%). The rubber component may include butadiene rubber, ethylene-propylene rubber, styrene-butadiene rubber, and polyethylene. They may be added directly to the polystyrene resin. The rubber component when used as a copolymer component includes such monomers as butadiene, isoprene, and chloroprene and oligomers thereof. They are copolymerized at a predetermined molar ratio with polystyrene resin. (In the case where a copolymer is used as the polystyrene resin, the copolymer containing the rubber component becomes a terpolymer.) Preferred for this invention are those high-impact polystyrenes that utilize a styrene/butadiene copolymer as the rubber component.

If the content of the rubber component is less than one percent (1 wt. %), the resulting foamed sheet is not suitable for producing deeply drawn parts. Cups produced from such a sheet lack strength and are liable to break at the lip. Moreover, such a sheet is insufficient in elongation and in productivity. On the other hand, if the content of the rubber component exceeds fifteen percent (15 wt. %), there is no additional benefit in thermoforming deeply drawn articles. Moreover, the foamed sheet may give off an odor of rubber, and is not suitable for producing food or drink containers.

The filler, which is also often a nucleating agent, is effective in improving the appearance and the dimensional accuracy and stability of the formed part. While not absolutely required, the use of a filler, especially for use as a nucleating agent is generally preferred when making foam sheet. If the content of the filler is too little, it may be difficult to adequately control gas and cell characteristics, and consequently to control the thickness of the foam sheet and the thermoformed part. On the other hand, if the content of the filler is excessive, the resulting foamed sheet is insufficient in elongation at the time of forming, although it is possible to control gas and cells. The content of the filler in the present invention, if required, is 0.005 to 1.4 wt. %, and preferably the content of the filler is 0.005 to 0.9 wt. %. Most preferably the filler content is about 0.005 to about 0.5 weight percent based on total resin weight.

Common examples of filler include talc, calcium carbonate, volcanic ash, gypsum, carbon black, white carbon, magnesium carbonate, clay, natural silica, and other common inorganic fillers and metal powder.

The thickness, bulk density, and draw ratio of the foamed sheet can be controlled by the amount of the filler used to produce foam sheet.

Foamed sheet thickness is important. If the thickness is less than 0.4 mm, the foamed sheet cannot be drawn deeply and the resulting formed part is insufficient in compression strength. If the thickness exceeds 6.5 mm, the formability becomes poor; particularly it is difficult to balance the side wall thickness and the bottom wall thickness. The preferred thickness (including the non-foamed resin film) will be at least partially dependent on the thermoformed deep drawn article. The thickness can be controlled by adjusting the slit of the extrusion die. The bulk density should be 0.04 to 0.16 g/cm$^3$. If it is higher than 0.16, more resin is required and more heat is required for forming, resulting in an extended forming cycle. On the other hand, if the bulk density is lower than 0.04, the foamed sheet is insufficient in strength and when its sheet is formed, the resultant tends to lack a dimensional accuracy. Usually, the preferred bulk density is 0.04 to 0.128 g/cm$^3$. Preferably the bulk density is adjusted by changing the quantity of a blowing agent.

Orientation takes place when the foamed sheet, after being initially extruded, is then taken up under tension, usually by being wound onto a roll. Biaxial orientation takes place in the case where a circular die is used. In such a case the foamed sheet is usually slit and laid flat while still under tension before being wound onto a roll. Uniaxial orientation is acceptable, but biaxial orientation is preferred in view of the strength of the resulting formed parts.

The foamed sheet of this invention is produced by extrusion-foaming that employs a volatile blowing agent up to about 20 weight percent based on the total weight of the composition. The examples of the volatile blowing agent include hydrocarbons having a boiling point of −40 degrees to 45 degrees C. (centigrade), such as propane, butane, isopentane and pentane; and polyfluorocarbon blowing agents, such as 1,1,-difluoroethane (HFC-152a); 1,2-difluoroethane (HFC-152); 1,1,1,2-tetrafluoroethane (HFC-134a); 1,1,2,2-tetrafluoroethane (HFC-134); 1,1,1-trifluoroethane (HFC-143a): and 1,1,2-trifluoroethane (HFC-143); pentafluoroethane (HFC-125), preferably HFC-152a and HFC-134a, and most preferably HFC-152a; chlorofluorocarbon and hydrochlorofluorocarbon blowing agents, such as chlorodifluoromethane (HCFC-22), dichlorodifluoromenthe (CFC-12) and trichlorofluoromethane (CFC-11). Of course, nitrogen, carbon dioxide, other inert gases, hydrocarbons and chemical blowing agents can be used in conjunction with the polyfluorocarbon blowing agents.

In some cases, carbon dioxide, nitrogen gas, water or a combination of these compounds may be used as a blowing agent. Carbon dioxide, used alone, is a preferred blowing agent.

In any case, after forming the foamed sheet, preferably the cells of the foam are substantially completely filled with air, making the foam sheet produced suitable for food contact applications.

The blowing agent may be introduced into the extruder in any manner conventional in the art.

The quantity of residual gas of the blowing agent or air which has infiltrated into the cells in the foamed sheet should be in amount so as to prevent secondary foaming or foam collapse from taking place when the sheet is heated for forming, resulting in the formed part being poor in the reproduction of mold.

If the quantity of residual gas measured immediately after sheet production is excessive or insufficient, degassing or air infiltration should be performed by heating the sheet to 40 degrees to 50 degrees C. or by permitting the sheet to stand for a certain period of time. When using carbon dioxide as the blowing agent it may be necessary to allowing the foam sheet to stand for a period of time prior to thermoforming, usually up to about 20 hours, until the incoming atmospheric gases in the air equilibrate with the escaping carbon dioxide. If this is not allowed to occur, foam sheet collapse may occur during thermoforming due to insufficient gas in the foam sheet cells.

The polystyrene foamed sheet thus prepared provides satisfactory formed parts, because the quantity of blowing gas in cells is controlled and the pressure in cells is not excessive or conversely does not become negative. The polystyrene foamed sheet containing 1 to 15 wt. % of rubber component is superior in elongation when heated for forming deep drawn articles. The appropriate amount of the rubber component, with the required characteristics, makes the foamed sheet of the present invention suitable for producing deep drawn thermoformed parts with improved formability.

While not required, it is desirable to laminate or extrusion coat a non-foamed thermoplastic resin film onto at least one surface of the foamed sheet in order to improve the elongation of the sheet at the time of forming and the compression strength of the resulting formed part. This non-foamed resin film is usually a 5 to 600 $\mu$m thick film of thermoplastic resin. This film may be laminated or extrusion coated onto one or both surfaces of the foamed sheet in any conventional manner. The thermoplastic resin for the non-foamed film includes, for example, polystyrene, polyethylene, high-impact polystyrene which is a mixture or copolymer of polystyrene and rubber, polypropylene, and polyethylene terephthalate. Preferable among them from the standpoint of formability are high-impact polystyrene and high-density polyethylene; most preferable is high-impact polystyrene. Surprisingly while the high-impact polystyrene shown in FIG. 1 would be unsuitable for producing the foamed sheet of the present invention, it is acceptable for use as the non-foamed resin film.

If the film thickness is less than 5 $\mu$m, there is no improvement in elongation or mechanical strength. If the film thickness exceeds 600 $\mu$m, the following disadvantage occurs. That is, when each formed part (such as a cup) is punched out from a formed sheet, the cells at the lip are collapsed and become open and the laminated film is peeled from the foamed sheet. Moreover, an excessively thick film is uneconomical. A preferable film thickness is 30 to 500 $\mu$m. Incidentally, this non-foamed film contributes to the printability and gas barrier properties of the resulting thermoformed part.

The non-formed thermoplastic film can be laminated onto the foamed sheet in various ways. For instance, the thermoplastic film may be laminated onto the foamed sheet in a die by using a co-extrusion die (e.g., crosshead die). In the other way, the foamed sheet and the thermoplastic film extruded from the separate dies can be continuously laminated, or the previously extruded thermoplastic film can be laminated onto the foamed sheet. The lamination may be achieved with an adhesive or by fusion-bonding. A variety of adhesives may be used for lamination, e.g., EVA copolymer and SBR in the form of solution, emulsion, or film.

The polystyrene foamed sheet laminated with a non-foamed resin film prepared as mentioned above is advantageous in that the elongation of the foamed sheet at the time of heating is improved and the compression strength of the resulting formed part is also improved. Thus, it is useful as a sheet stock for forming various products that require high dimensional accuracy, particularly deeply drawn articles (having a draw ratio greater than 1) that need high compression strength and sufficient elongation at the time of forming. However, with or without the non-foamed resin film(s), the foamed sheet of this invention is superior in productivity and therefore is useful as a sheet stock for volume production of deep drawn formed parts.

The conventional approach for making formed articles from foamed or cellular thermoplastics is a two-stage process. In the first stage, foamed sheeting is extruded and collected on rolls. At this point, one may laminate one or more films onto the foamed sheeting. The rolls are then stored until the second stage, which employs a conventional thermoforming machine for reheating the material on a progressive basis and forming it in molds through the use of differential air pressure, plungers, or both, whereupon the formed web is transported to a cutting machine for severing the formed articles from the selvage. The extrusion operation for producing the sheet material is thus, usually, an entirely separate operation (in relation to time and the utilization of heat energy) from the fabricating operation for forming and cutting the articles.

The conventional two-stage process has many limitations affecting cost, quality control, and operational control. Because of the separation of the extrusion and fabricating operations, quality control becomes more difficult and costly. Defects in the sheeting which are not apparent until molding begins can not then be corrected, resulting in the rejecting of large quantities of material. Since foam sheeting has excellent thermal insulating properties, it is difficult and costly to heat it properly during the fabrication step. With certain types of thermoplastic foam sheeting, there is a period of aging during which volatiles used in the foaming process are evolved and replaced by air. Therefore, careful attention must be paid to the time when the reheating in the fabrication step takes place, because the residual content of the volatiles can have an appreciable effect on the final density of the product. This necessitates operational controls which further complicate the manufacturing process. Because of the difficulties in obtaining uniform heat and because of the necessity of waiting until a large percentage of the volatiles have evolved from the material, it is not possible to form the foam sheeting as readily or as deeply as would otherwise be the case.

Moreover, problems which plague the two-stage process become even more difficult when attempting to thermoform deep drawn articles from foamed thermoplastic having a low-density core covered with an integral skin of the same material. It is extremely difficult to reheat the core to the necessary forming temperature without adversely affecting the skin. The presence of the skin tends to produce uneven reheating of the sheeting, resulting in imperfections in the formed articles. Molecular orientation of the skin, which may be important to the overall strength of the formed product, is reduced or destroyed by reheating. Continuous processes developed heretofore, in which extrusion and fabrication steps follow without interruption, have not met the requirements for successful application to deep drawn low-density foamed thermoplastics.

EXAMPLES

Foam sheet was produced by extrusion with 80% of a polystyrene homopolymer having a weight average molecular weight of about 325,000 and a melt flow rate of about 1.5 grams/10 minutes and 20% of a high≅impact polystyrene resin having 8.5 percent rubber based on the weight of the polystyrene, a weight average molecular weight of 165,000, a melt low of 6.7 grams/per 10 minutes and rubber particle sizes of 0.2 microns and 1.8 microns. The ratio of small particles to large particles was 87/13. The blowing agent used, in an amount of 4.8 weight percent, based on total weight, was chlorodifluoromethane (HCFC≅22). Additionally 0.9 percent talc was added as a filler.

The foam sheet was 0.135 to 0.140 inches thick (3.43≅3.56 millimeter) with a 0.18 mm cell size and a six lb./ft$^3$ (0.10 g/cc) density. The foam sheet was then extrusion coated on one major surface by extruding a molten impact polystyrene onto the foam sheet to form a film. The impact polystyrene had 8 percent rubber based on the weight of the polystyrene, a weight average molecular weight of 170,000, a melt flow of 8.5 grams/per 10 minutes and rubber particle sizes of 2.8 microns. The film was extruded at three thicknesses of 0.006, 0.009 and 0.012 inches (0.15, 0.23, 0.30 mm). This sheet was then rolled into rolls and allowed to age.

Then prior to thermoforming a second 0.006 skin layer of the same impact polystyrene was laminated to the other major foam sheet surface that had not been extrusion coated.

Figure 3:
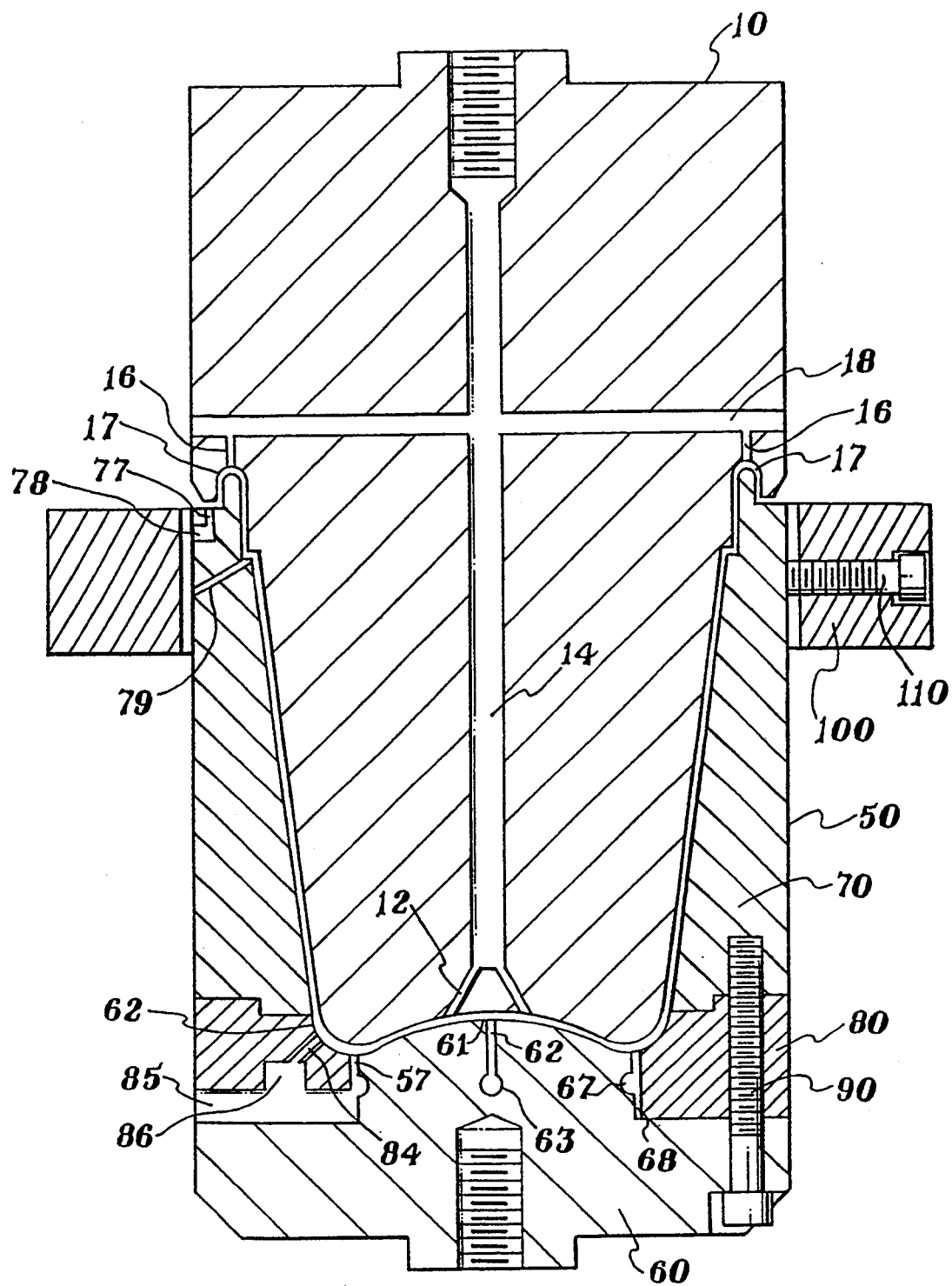
FIG. 3 is a sectional view of a male/female mold pair used to form a deeply drawn thermoformed article, in this instance a cup.

Cups were then thermoformed from these samples on a conventional continuous feed thermoformer having a male and female mold pair. As can be seen in the sectional view of FIG. 3, the male and female mold pair have been altered to provide a vacuum in both the male and female mold members to assist in forming this sheet into a cup.

It has been found that an important element for successful forming in accordance with the method of the present invention is the specific design of the male and female mold members as well as its material of construction. The shape and material of the mold members may control the distribution of the foam sheet material along the side walls of the article being formed. Different materials of construction will result in marked differences in the distribution of material. Accordingly, mold member construction material must be individually selected depending upon the shape of the article being formed and the desired material distribution in the formed article. Suitable materials include steel, nylon, aluminum, and syntactic foam, for example. For this article, aluminum is the preferred mold member construction material. It will be understood that the method of the present invention is not limited to a single cavity mold operation, but multiple cavity molds may also be employed.

The mold pair is made of five pieces. The male mold member 10 is a single piece. The female mold member 50 has four pieces, the top sidewall piece 70, the top sidewall ring 100, the bottom sidewall piece 80 and the convex bottom piece 60. The the top sidewall piece 50, the bottom sidewall piece 80 and the convex bottom piece 60 are held together by four bolts 90. The top sidewall ring is bolted into the top sidewall piece 70 with three equally spaced bolts 110.

Male mold member 10 has four equally spaced vacuum holes 12, whose diameters are 0.020 inches (0.051 millimeters), in the concave bottom of the piece, with the four holes forming a square around the central end point of a central vacuum channel 14 in the male mold member at the point of greatest extension into the female mold member 50. Thirty two additional vacuum holes 16 are located at the topmost area 17 in the male mold member of the article to be thermoformed, in this case a cup rim. These two vacuum holes 16 communicate with vacuum channel 18 which is also in communication with vacuum channel 14, while the other thirty vacuum holes have a channel about 0.12 inch in diameter, just deep enough to communicate with the holes as opposed to extending completely through the male mold member, as does vacuum channel 18.

Female mold piece 60 has three vacuum holes of the same diameter (0.020 inches) located in the center 61 of the convex bottom 60 of the female mold with one hole 62 located at the highest convex point and the other two holes placed linearly left and right of the center hole spaced a small distance apart. All three holes communicate with vacuum channel 63. Female mold piece 70 also has eighteen equally spaced holes 77 which each communicate with vacuum channel 78 about 0.12 inch in diameter. There are also eighteen additional vacuum holes 79 which communicate between the interior and the exterior of the female mold piece 70. The top sidewall ring 100 has been slightly oversized so as to produce enough of a gap between the top sidewall piece 70 and the top sidewall ring 100 so that the vacuum channels 78 and the vacuum holes 79 are accessible when reducing pressure. In the bottom sidewall piece 80 of the female mold 50, there are thirty two equally spaced vacuum holes 84 of 0.020 inch diameter which communicate with an annular groove 86 which is part of vacuum channel 85. An annular ring 67, with an opening of about 0.025 inch, communicates with an annular vacuum channel 68 in the convex bottom piece 60. The annular vacuum channel 68 and vacuum channel 63 are also in communication with the four equally spaced vacuum channels 85. The annular ring provides a full annular ring vacuum when thermoforming as opposed to separate and non-interconnected vacuum holes in a ring formation.

The gap between the male mold member 10 and the female mold member may range between about 0.01 and about 0.07 inch (0.25–1.78 mm).

This mold pair is then completely placed in in a unit which can be used to reduce air pressure and obtain a partial vacuum.

Surprisingly, in the mold members of the present invention, vacuum is present both above (in the male mold member) and below (in the female mold member) the foamed sheet which is being thermoformed, as opposed to just using the vacuum assist to pull the sheet into the female mold member.

The foam sheet was then thermoformed in a conventional multicavity thermoformer using the previously described specifically designed male and female mold members.

The foam sheet was first preheated in a preheating area to a softening point temperature so that it can be thermoformed into the desired cup shape.

The foam sheet continued through the thermoformer to the forming postion area and was clamped in position at the top sidewall ring 100.

The male and female mold members were then moved together into the final forming position to stretch the foam sheet around the male mold member and into the female cavity.

As this was happening the pressure was reduced by about of 25 inches of mercury (at 60 degrees Fahrenheit) (85 kilopascals) thus applying a vacuum to both sides of the foam sheet as it is being stretched into the final forming position.

Then the final shape of the foam sheet is set by chilling. The chilling is accomplished allowing the mold members whose temperature is just below the softening point (preheat temperature) of the foam sheet to remain in the final postion long enough to reduce the foam sheet temperature below the softening point.

The thermoformed cups produced in Examples had a draw ratio on the order of about 1.25:1, a total wall thickness of about 0.044 inch (1.12 mm) and also had the following dimensions:

| Height | 3.45 inch (87.6 mm) |
| Top Outer Diameter | 2.75 inch (69.8 mm) |
| Bottom Outer Diameter | 2.00 inch (50.8 mm) |

Figure 4:
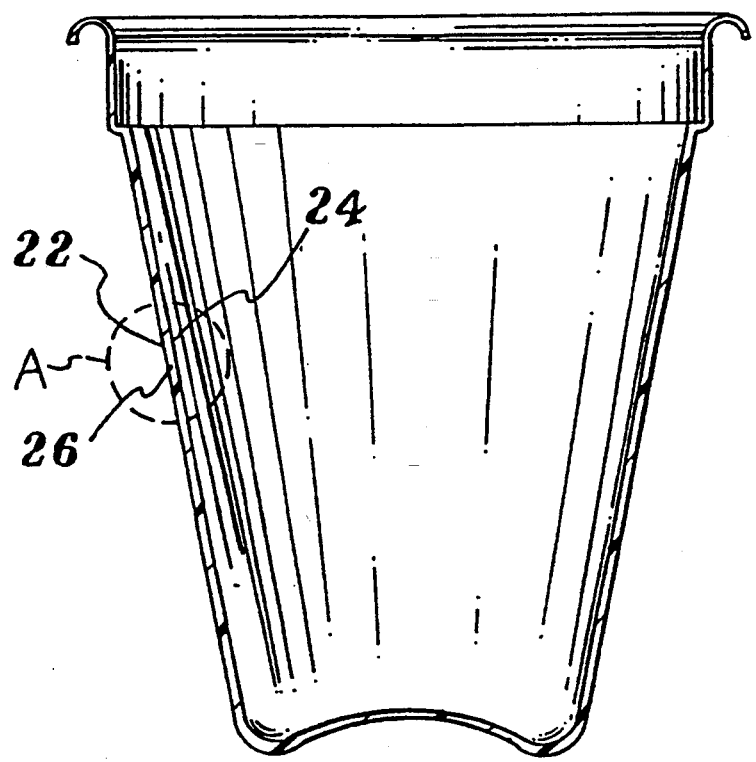
FIG. 4 is a deeply drawn article, a cup, formed using the mold pair of FIG. 3.
Figure 5:
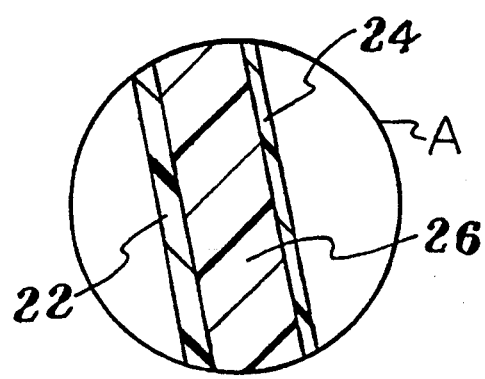
FIG. 5 is a cross-sectional view of the sidewall of FIG. 4.

The foam sheet sample with the 0.009 inch extrusion coating and 0.006 inch skin layer in conjunction with the foam produces a nine ounce cup having acceptable wall strength. FIG. 4 is a cross sectional view of this cup. As can be seen in FIG. 5, a close-up of the cross-sectional sidewall shows that the 0.009 inch extrusion coated exterior wall 22 and the 0.006 inch laminated interior wall 24, as well as the foam layer 26.

Tests were conducted by applying a force to a horizontal cup sidewall one-third the distance from the top of the cup measured from the cup rim on a compression testing machine at a rate of 10 inches (250 mm) per minute. The cup must be held in place horizontally with the cup sidewall placed between a fixed member and a movable member which are both longer than the cup diameter at the rim and have a cylindrical surface of at least 3.2 mm radius which touches the cup sidewall. The value is then taken at the first yield point, that is the point at which the value decreases or remains the same for increasing deflection of the sidewall. This test is intended to imitate the performance of a cup when a user is holding it.

EXAMPLE 1 is an example of the present invention and is described previously as the example with the 0.009 inch extrusion coating and a 0.006 inch laminated coating.

COMPETITIVE EXAMPLE is a foamed bead cup. Usually such cups are made by molding foam beads into the shape of a cup.

| EXAMPLE 1 | 0.71 pounds |
| COMPETITIVE EXAMPLE | 0.45 pounds |

Preferably Example 1 of the present invention would have a rolled rim, as is conventional in the art, which would increase the force necessary to deflect the side wall. However, even without a rolled rim, Example 1 requires a greater force to deflect the side wall than does the foam bead cup (Competitive Example) which indicates that the foam cup of the present invention has a better crush resistance then the Comparative Example. Thus, it is more difficult for people to accidently squeeze the cup walls together when holding the cup of the present invention.

In another test thermocouples were attached to the exterior side wall of a conventional paper cup and the foam cup of the present invention. When temperatures at the exterior wall ceased rising, the temperature of the conventional paper cup was 174 degrees Fahrenheit (°F.) versus 156° F. for the cup of the present invention. The difference in exterior wall temperature is significant when a person holds each cup.

In another series of Examples foam sheet similar to the previous examples was prepared without any coatings or laminations and was also thermoformed into cups having a draw ratio greater than 1:1.

It is to be understood that the foregoing description is merely illustrative of preferred embodiments of the invention, of which many variations may be made by those skilled in the art within the scope of the following claims without departing from the spirit thereof.

What is claimed is:

1. A polystyrene foam sheet for thermoforming comprising a polystyrene resin which contains 1 to 15 wt. % of a rubber component, based on the polystyrene resin, having a majority of particle sizes less than about 0.45 microns with the foam sheet having a density of 0.04 to 0116 g/m$^3$ (2½–10 lb/ft$^3$) and a thickness of about 0.4 to 6.5 mm.

2. A polystyrene foamed sheet of claim 1, having the rubber component in an amount of 1 to 10 weight percent.

3. A polystyrene foamed sheet of claim 1, having the rubber component in an amount of 1 to 5 weight percent.

4. A polystyrene foamed sheet of claim 1, which also has 0.005–1.4 weight percent of a filler.

5. A polystyrene foamed sheet of claim 1, which also has 0.005–0.9 weight percent of a filler.

6. A polystyrene foamed sheet of claim 1, having a non-foamed film on at least one major surface.

7. A polystyrene foamed sheet of claim 1, having a non-foamed film on both major surfaces.

8. A polystyrene foamed sheet of claim 6 in which the non-foamed film has a thickness of 5–600 μm.

9. A polystyrene foamed sheet of claim 7 in which the non-foamed film has a thickness of 5–600 μm.

10. A polystyrene foamed sheet of claim 6 in which the non-foamed film is polystyrene, polyethylene, high-impact polystyrene, polypropylene or polyethylene terephthalate.

11. A polystyrene foamed sheet of claim 7 in which the non-foamed film is polystyrene, polyethylene, high-impact polystyrene, polypropylene or polyethylene terephthalate.

12. A polystyrene foamed sheet of claim 6 in which the non-foamed film is polystyrene or high-impact polystyrene.

13. A polystyrene foamed sheet of claim 7 in which the non-foamed film is polystyrene or high-impact polystyrene.

14. A deep drawn article comprising, the polystyrene foamed sheet of claim 1.

* * * * *